Sept. 6, 1927. 1,641,398

B. F. SCHMIDT ET AL

CAR MOVER

Filed March 22, 1926

Inventors
Benjamin F. Schmidt
Triphon D. Heyl
By
R. S. Berry
Attorney.

Patented Sept. 6, 1927.

1,641,398

UNITED STATES PATENT OFFICE.

BENJAMIN F. SCHMIDT AND TRIPHON D. HEYL, OF LOS ANGELES, CALIFORNIA.

CAR MOVER.

Application filed March 22, 1926. Serial No. 96,457.

This invention relates to car pushers for manually moving railroad cars and the like and comprises an improvement on our prior invention patented May 23, 1922, No. 1,416,755.

The principal object of the invention is to provide an improved car pusher which is of simplified construction and capable of maximum propelling force for moving a car along a track.

Another object is to provide a device of the character described, which may be placed on one rail of a track and abutting one of the wheels to be moved and which by downward pressure upon a suitable lever, will act on a wheel of a car to move the car along a track.

Another object is to provide a car pusher which may be operated by the downward movement of the lever and which will move forward on the rail with each upward movement of the lever to follow up the wheel of a car.

Another object is to provide a car pusher having an initial short stroke with a corresponding long leverage for starting the car in motion and a continued leverage when the car is in motion.

Another object is to provide a car pusher in which the same force need only be applied to start the car moving as would be used in keeping it in motion.

A further object is to provide in a device of the character described, means whereby the fulcrum connection between the lever and the pushing element is moved or shifted, so that as the lever is actuated in a downward direction, the force exerted against the wheel is progressively increased.

A still further object is to provide a car pusher which will automatically grip the rail when the car is being pushed but which will readily disengage when being advanced to follow up the wheel.

Other objects will appear hereinafter.

The invention is illustrated in the accompanying drawings, in which:—

Figure 1:
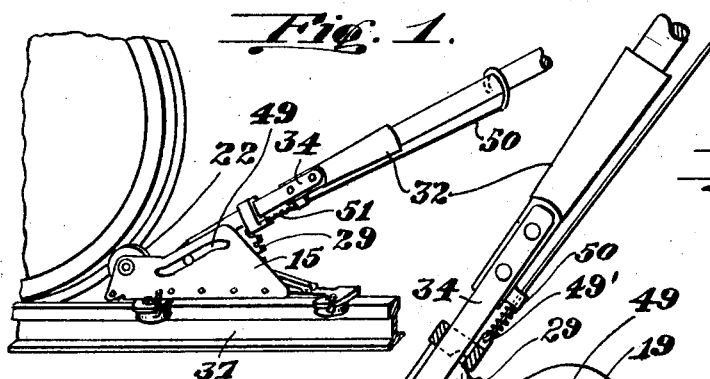
Fig. 1 is a perspective view of the improved car pusher in intermediate actuating position with respect to a car wheel.

Referring specifically to the drawings in which similar reference characters designate similar parts in each of the several views, our invention, in its present embodiment, comprises a divided shoe 10 formed to slidably engage a rail 11 and adapted to slide forwardly thereon. Shoe 10 comprises two separate members 12 and 13, the member 13 normally resting upon the tread of the rail and the member 12 having its lower surface slidably engaging the upper surface of the member 13 and being operable thereon.

The forward member 13 is provided with side walls 14 and 15 which extend vertically upward to provide a space 16 in the lower end of which is mounted a rack bar 17, secured to the said side walls by means of screw bolts 18 and being positioned immediately above member 12. The side walls 14 and 15 of member 13 extend upwardly in triangular conformation as at 19 and are formed with forwardly extending portions 20, having diagonally disposed extensions 21 provided thereon.

Positioned at the forward end of the extending portions 20 of walls 14 and 15, is a roller 22 rotatably mounted on a pin 23 which passes from one wall to the other and the roller has its surface milled to insure traction with a wheel flange.

Another roller 24, preferably of smaller diameter, is situated below roller 22 being mounted on a pin 25 secured to the opposite walls of the diagonally disposed extensions 21 and its surface is also milled and frictionally engages the upper roller. Roller 24 is likewise adapted to frictionally engage the surface of the rail to insure traction thereon during the pushing operation.

The rear portion of the shoe member 12 is provided with an extension 25 formed integral therewith and pivoted thereto by means of a pin 26, is link 27, the forward end of which is slotted at 28 for the reception of a segmental gear element 29, through which extends a pin 30 having its opposite ends 31 extending through openings in the free ends of the link 27 and side members 14 and 15.

A lever 32 has strap connections 33 and 34 with the gear element 29 and when actuated, causes the toothed portion of the gear element to engage the successive spaced openings in the rack bar 17 to cause the thrust or retrograde movement of shoe member 13 with respect to the shoe member 12.

The forward member 13 is provided with a transversely disposed plate 35 the ends of which project outwardly therefrom at opposite sides and one of these ends is formed with a depending flange 36, adapted to slidably engage the rail 37 on which the plate 35 rests. This flange 36 is provided with a central opening in which is mounted a screw bolt 38 having a nut head 39. The screw bolt 38 is positioned so that its inner end engages one side of the tread of the rail 37. A lock nut 40 on bolt 38 when tightened engages the plate flange 36 and serves to hold the bolt in position against rail 37.

Directly opposite the flange 36 is a cam 41 having a toothed surface 42. The cam is mounted on a pin 43 and extends below the opposite end of plate 35 and is adapted to form with bolt 38, a vice-like grip upon the rail. The profile of the cam 41 is such that any force tending to move the member 14 backwardly on the rail will force the cam to fixedly engage the rail and also draw the bolt 38 into close contact with the rail. A coil spring 44 is provided which is adapted to hold the cam yieldably against the rail, one end of the spring being secured to the pin 43 and the other end fixed to a projecting portion 41' of the cam. This portion 41' provides a means for kicking the cam loose from engagement with the rail should it adhere to the rail too fixedly when it should normally be free.

A rear plate 45 is preferably formed integral with the shoe member 12 is also provided with a similar cam 46, flange 47 and bolt 48, adapted to operate in the same manner.

When the lever 32 is forced downwardly, the ends 31 of pin 30 passing through gear segment 29 and fulcrumed in the arcuate slots 49 of the triangular upstanding portions 19 of side walls 14 and 15, and as the link 27 is connected to the pin 30 at its opposite end, movement exerted by lever 32, is imparted to the link 27, serving to rock its outer end on the pivot 26, by which it is connected to shoe member 12. Resultantly, the continued downward movement of the lever 32 imparts movement to gear 29, bringing it into engagement with the rack bar 17 and as the shoe member 12 is held through cam 46 clamped to the rail, the link 27 pivoted thereto and to pin 30, is moved upwardly by reason of its connection with pin 30 and exerts a force in a constantly changing angular plane, to force the shoe member 13 forwardly to bring the roller 22 into direct contact with the wheel tread and simultaneously to cause the small roller 34 to take traction on the track.

When lever 32 is in its lowermost position, the shoe member 13 has been moved forwardly and its maximum pushing capacity has been expanded and during this pushing operation, the outer cam 41 is free from engagement with the rail, while the rear cam 46 clutches the rail and holds the shoe member 12 stationary. The cam 46 is then kicked loose from engagement with the rail and cam 41 is actuated to cause the same to clinch the rail to hold the shoe member 13 stationary. While the shoe member 13 is being held stationary, the lever 32 is actuated to elevated position bringing the gear element 29 into engagement with the rack bar 17 and the pin 30 connected to link 27 travels downwardly in the plate slots 49, thereby drawing the end of member 12 within the space 16 of the shoe member 13, so that the device is ready for another thrust operation.

Figure 2:
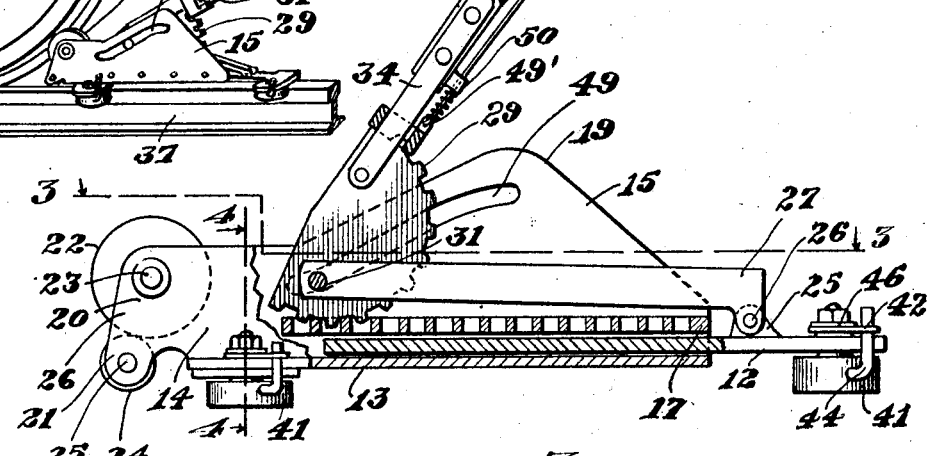
Fig. 2 is an enlarged side elevation of the pusher with a portion of the actuating mechanism in section.
Figure 3:
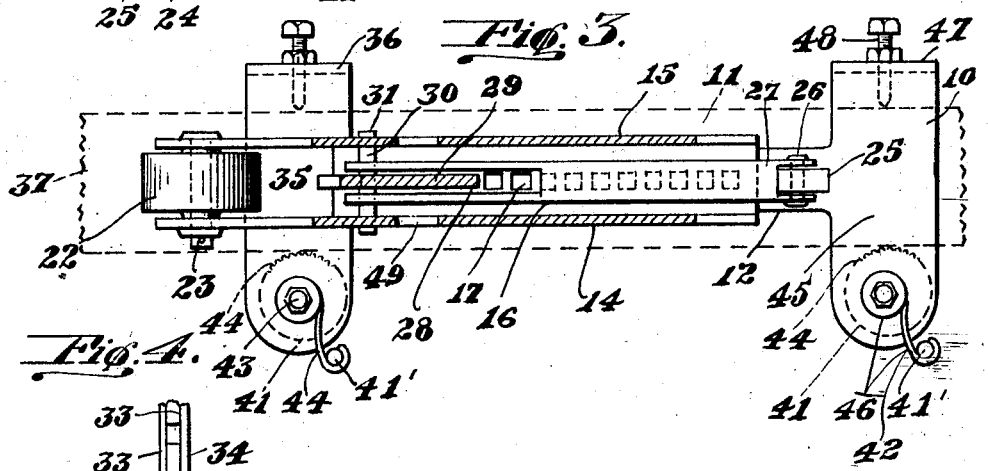
Fig. 3 is a section on line 3—3 of Fig. 2 looking downwardly.
Figure 4:
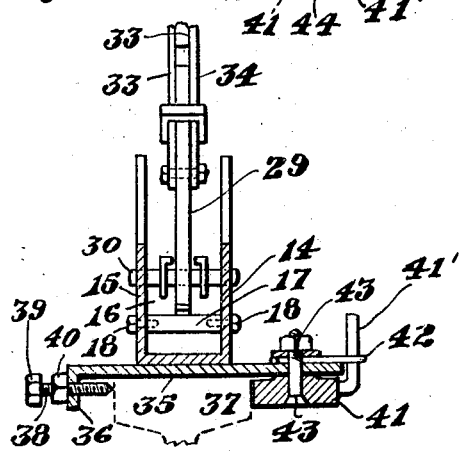
Fig. 4 is a vertical section on line 4—4 of Fig. 2 looking in the direction of the arrows, illustrating the handle connection to the pusher.

In the use of the device, the lever is positioned as near to the vertical as possible, as illustrated in Fig. 2 with the ends of pin 30 in the lower ends of the slots 49 of side walls 14 and 15 of member 13, to provide as long leverage as possible. The device is then placed upon a rail as shown in Fig. 1, the roller 22 abutting the wheel of the car to be moved. The position of the lever and roller, the lever and the relation of the shoe to the rail is clearly shown in Fig. 1, when the handle is in its upper position. When the lever is forced downwardly, the two members 12 and 13 tend to separate. The cam 46 and bolt 48 prevent the rear member 12 from sliding backwardly and thus the forward member 13 is advanced forcing roller 22 against the wheel and tending to move the car of which the wheel is a part. As the shoe 13 moves forwardly, the traction of the roller 24 with the rail rotates the upper roller 22, which is engaging the wheel and tends to assist in rotating the wheel.

It will be readily apparent that much of the thrust is taken up by the larger roller 22 and the smaller roller further assuring good traction with the rail. Upon the first downward movement or stroke of the lever, the car is started moving slightly and as the lever is depressed further, the pin 30 connected to the gear segment 29 and link 27, progressively moves upwardly within the slots 49. As the link 27 at its point of connection to the pin 30 is elevated, it exerts a forward pull with the gear segment upon the rack bar serving to accelerate the forward movement of shoe 13.

When the lever is returning to the vertical position, the forward cam 41 grips the rail to prevent the forward member 13 from sliding backwardly and thus the link 27 draws the rear member 12 forwardly, bringing the members together. The operation is then repeated, the cams alternately holding either member to the track to prevent retrograde movement causing the device to creep forwardly on the rail with each complete stroke of the lever.

As either member is adapted to slide forwardly readily upon the rail, the device may be pushed forwardly by pushing on the lever in case the car moves beyond the normal stroke of the shoe.

Likewise, we have provided an escapement device for the lever and handle, whereby the same may be regulated with respect to the connection to the gear segment 29, in which case we provide a pawl member 49' connected to a wire rod 50, by means of which the pawl may be actuated to position the same within one of the toothed portions of the gear segment. A coil spring 51 interposed between the pawl and rod serves to normally hold the handle in adjusted position. In this manner, the handle may be positioned at different angles with respect to the gear segment to allow for obstruction encountered by the overhanging end of a car.

It is manifest, that by reason of the novel mounting of the pin 30, connecting the gear segment 29, link 27 and lever 32, the ends 31 of the pin extending within the arcuate slots 49, upon the downward thrust of the lever function to progressively change their fulcrum points. As the lever is depressed the fulcrum points as exemplified by the successive positions of the pin ends with respect to the slots, are changed, and consequently, greater leverage is progressively obtained during the downward stroke of the lever.

Although we have herein shown and described only one form of car pushing apparatus, embodying our invention, it is to be understood that various changes and modifications may be resorted to without departing from the spirit of the invention and the spirit and scope of the appended claims.

We claim:—

1. A car mover comprising a pair of rail engaging elements, independent rail gripping devices for said elements, a roller carried by one of the elements for engagement with the rail, a second roller carried by the same element in contact with the first named roller and for engagement with a car wheel, a gear for affecting relative movements of the two elements, a lever for operating said gear, and an automatically shiftable fulcrum for said lever whereby to affect initial maximum leverage for starting the movement of the car wheel then progressively decreasing leverage for a continued movement of the car wheel.

2. A car mover comprising a pair of rail engaging elements, a rail gripping device for each element, a segment and rack for affecting relative movements of the two elements, a lever for the movement of said segment, a pivot for the support of said lever a slotted bearing for said pivot and a wheel engaging device carried by one of the elements, said slotted bearing providing maximum leverage for the starting of the car and a graded leverage for the continued movement of the started car.

3. A car mover comprising an element having a car wheel engaging device, a rail gripping means, a rack bar, a gear, having an eccentric pivot, a slotted bearing for the pivot, a lever, means for connecting the lever with said gear at selective angles, and a second element having a rail gripping means, and a link connection with said gear of the first mentioned element.

BENJAMIN F. SCHMIDT.
TRIPHON D. HEYL.